(12) United States Patent
Pfaffenberger

(10) Patent No.: US 6,261,061 B1
(45) Date of Patent: Jul. 17, 2001

(54) METHOD AND APPARATUS FOR MOUNTING A BEARING

(75) Inventor: Eugene E. Pfaffenberger, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 09/563,204

(22) Filed: May 2, 2000

Related U.S. Application Data

(63) Continuation of application No. PCT/US99/04353, filed on Feb. 26, 1999.
(60) Provisional application No. 60/076,255, filed on Feb. 27, 1998.

(51) Int. Cl.[7] ............................. F01D 25/16; F16C 33/34; B23P 15/00
(52) U.S. Cl. ................... 415/229; 415/170.1; 415/174.2; 415/111; 384/585; 384/492
(58) Field of Search .................................... 415/229, 231, 415/230, 174.2, 170.1, 111, 1; 384/535, 492, 569, 537, 584, 585, 907.1; 29/898.062

(56) References Cited

U.S. PATENT DOCUMENTS

| | | | |
|---|---|---|---|
| 3,061,386 | 10/1962 | Dix et al. | 384/535 |
| 4,155,605 | 5/1979 | Glaser . | |
| 4,272,216 | 6/1981 | Osburn . | |
| 4,276,947 | 7/1981 | Hebel . | |
| 4,448,016 | 5/1984 | Thalmann . | |
| 4,623,297 | 11/1986 | Beam, Jr. | 415/170.1 |
| 4,792,244 | 12/1988 | Yamashita et al. | 384/492 |
| 4,808,014 | 2/1989 | Ueda et al. | 384/492 |

(List continued on next page.)

FOREIGN PATENT DOCUMENTS

| | | |
|---|---|---|
| 3706365 C1 | 9/1988 | (DE) . |
| 0 345 214 B1 | 8/1993 | (EP) . |
| 1-295025 | 11/1989 | (JP) . |

OTHER PUBLICATIONS

Zaretsky, E.V., Ceramic Bearings for Use in Gas Turbine Engines, NASA Lewis Research Center, Cleveland, OH 44135 Fellow ASME, vol. 111, Jan. 1989.

Baumgartner, H.R., Evaluation of Roller Bearings Containing Hot Pressed Silicon Nitride Rolling Elements, Norton Company, High Performance Ceramics, Worchester, Massachusetts, Nov., 1973.

Hosang, G.W., Turbomach, Sundstrand, AIAA–87–1844 Results and Design Techniques from the Application of Ceramic Ball Bearings to the Meradcom 10 kW Turbine, American Institute of Aeronautics and Astronautics, San Diego, California.

Allison Tolerance Rings (2 pages).
Allison "Prior Art" (1 page).
Allison "Prior Art" (1 page).
USA Tolerance Rings (2 pages).

*Primary Examiner*—Edward K. Look
*Assistant Examiner*—Richard Woo
(74) *Attorney, Agent, or Firm*—Woodard, Emhardt, Naughton, Moriarty & McNett

(57) ABSTRACT

A method and apparatus for mounting a bearing on a shaft. An intermediate member is mounted on the shaft. The inner race of the bearing is mounted onto the intermediate member. Two separable compression members are mounted on the outer diameter of the inner race. The compression members are mounted with an interference fit, thus inducing a state of compression in the inner race. The intermediate member is radially compliant and compensates for thermal growth of the shaft in excess of the thermal growth of the inner race. The state of compression in the inner race persists to about 1000° F. In one embodiment, the present invention includes an inner race fabricated from a material with low fracture toughness or for which a state of compression is desirable, such as a ceramic material.

27 Claims, 6 Drawing Sheets

U.S. PATENT DOCUMENTS

| | | | |
|---|---|---|---|
| 4,968,158 | 11/1990 | Atkinson et al. | 384/535 |
| 4,997,296 | 3/1991 | Narita et al. | 384/492 |
| 5,033,877 | 7/1991 | Bowen | 384/585 |
| 5,176,456 | 1/1993 | Takebayashi et al. | 384/492 |
| 5,197,808 | 3/1993 | Takata | 384/585 |
| 5,306,565 | 4/1994 | Corbin et al. | 384/967.1 |
| 5,568,985 | 10/1996 | Schutte . | |
| 5,575,571 | 11/1996 | Takebayashi et al. | 384/492 |
| 5,600,867 | 2/1997 | Niwa et al. | 384/492 |
| 5,743,016 | 4/1998 | Manne et al. . | |
| 5,775,816 | 7/1998 | Baranek et al. . | |
| 5,971,706 * | 10/1999 | Glista et al. | 415/170.1 |

\* cited by examiner

METHOD AND APPARATUS FOR MOUNTING A BEARING

The present application is a continuation application of PCT/US99/04353 filed Feb. 26, 1999. PCT/US99/04353 claims the benefit of U.S. Provisional Application No. 60/076,255 filed Feb. 27, 1998. The applications PCT/US/99/04353 and 60/076,255 are incorporated herein by reference.

BACKGROUND OF THE INVENTION

The present invention relates generally to an apparatus and method for mounting a bearing. More particularly, in one embodiment, the present invention defines an apparatus for mounting a ceramic inner race of a bearing for a gas turbine engine. Although the present invention was developed for use in a gas turbine engine, certain applications may be outside of this field.

There is a continuing need to improve the efficiency and simplify the construction of the gas turbine engine. One approach is the development of materials for bearings that do not require lubrication, or that use lubrication systems which are simplified. Ceramic materials, particularly silicon nitride, are candidate bearing materials for such advanced gas turbine engines. Other materials, including variants of ceramics and metals, will doubtless be proposed in the future.

There are problems, however, in the use of ceramics when the ceramic material is under tension. Ceramics are typically characterized with low fracture toughness, meaning that imperfections in the material result in the bearing being susceptible to tensile failure. Other materials may have similar problems, or may be better suited to bearing applications if the degree of tension in the material can be controlled.

Various inventions have been proposed for providing bearings within gas turbine engines. Examples of bearings can be found in the following U.S. Pat. No. 4,792,244 issued to Yamashita et al; U.S. Pat. No. 5,176,456 issued to Takebayashi; U.S. Pat. No. 5,575,571 to Takebayashi et al.; U.S. Pat. No. 4,968,158 issued to Atkinson et al.; U.S. Pat. No. 5,306,565 issued to Corbin et al; U.S. Pat. No. 4,997,296 to Narita et al.; U.S. Pat. No. 5,197,808 to Takata; U.S. Pat. No. 5,568,985 to Schutte; U.S. Pat. No. 5,600,867 to Niwa et al. al.; U.S. Pat. No. 5,197,808 to Takata; U.S. Pat. No. 5,568,985 to Schutte; U.S. Pat. No. 5,600,867 to Niwa et al.

Even with the variety of earlier designs, there remains a need for an improved apparatus and method for mounting the inner race of a bearing. The present invention satisfies this need in a novel and unobvious way.

SUMMARY OF THE INVENTION

One aspect of the present invention concerns an apparatus which includes a shaft, a ceramic inner race, an intermediate member, and a first separable compression member. The intermediate member is mounted on the shaft, and the inner race is mounted on the intermediate member. The intermediate member permits differential thermal growth between the shaft and the inner race. The separable compression member radially compresses the inner race.

Another aspect of the present invention concerns a method for mounting an inner race of a bearing on a shaft. The method includes providing a gas turbine with a shaft, a ceramic inner race, an intermediate member with a general split ring shape, a first ring and a second ring. The method includes loading a compressive stress into the inner race, and placing the intermediate member on the shaft between the shaft and the inner race. The first ring, second ring, and inner race are urged together in an axial direction. The urging together compresses the inner race in a radial direction.

Another aspect of the present invention concerns an apparatus comprising a gas turbine and a shaft rotatable within the gas turbine. There is an inner race rotatably supporting the shaft, the inner race having an outer diameter, an inner diameter, and two ends, each end having a contact face. The apparatus includes a first ring and a second ring, the first ring and one of the contact faces being urged together, and the second ring and the other of the contact faces being urged together. There is also a plurality of rolling elements in rolling contact with the inner race. The apparatus includes a first separable member mounted to the inner race and a second separable member mounted to the inner race. The first separable member and the second separable member provide a guide for the rolling elements. The one contact face and the first ring are constructed and arranged so as to radially compress the inner race when urged together, and the other contact face and the second ring are constructed and arranged so as to radially compress the inner race when urged together.

In another aspect of the present invention, there is an apparatus including a ceramic inner race mounted by a spring member to a shaft. The spring member provides thermal dissociation between the ceramic inner race and the shaft. The spring member is constructed and arranged so as to not build up internal hoop stresses as the shaft expands.

In yet another aspect of the present invention, there is an apparatus for placing a ceramic inner race in a state of compression. The apparatus includes a first separable member and a second separable member that are interferingly fit onto the outer diameter of the inner race. The first and second compression members also provide a guideway for rolling elements of the bearing.

In yet another aspect of the present invention, there is a method for lubricating a bearing in which the guideways for the rolling elements are fabricated from a material that forms a lubricious oxide coating after exposure to the proper temperature. This oxide coating lubricates the rolling elements.

One object of the present invention is to provide an improved bearing for a gas turbine engine.

Related objects of the present invention will be apparent from the following description.

DESCRIPTION OF THE PREFERRED EMBODIMENT

Figure 1:
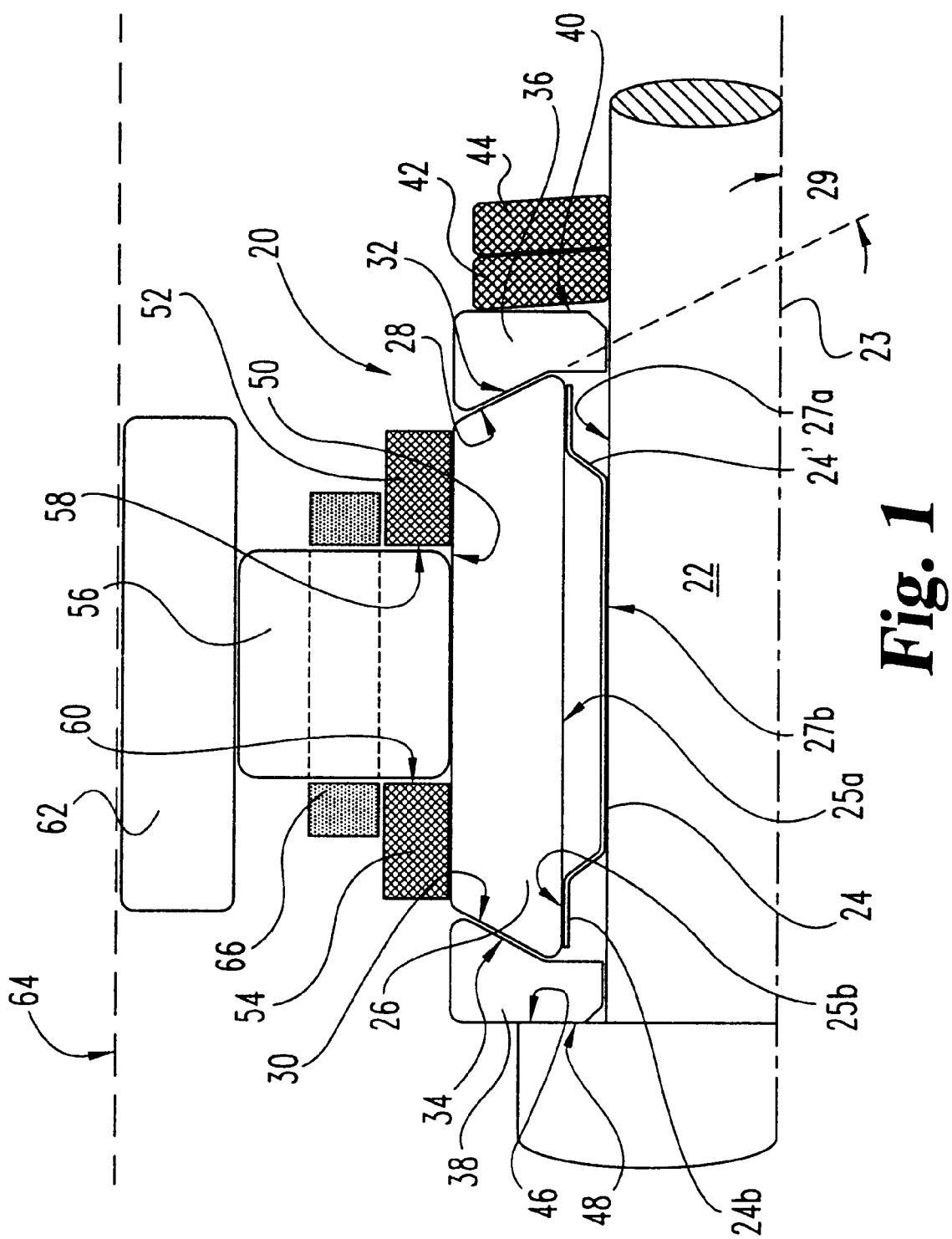
FIG. 1 is a diagrammatic cross-sectional view of one embodiment of the present invention within a gas turbine engine.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated and described herein being contemplated as would normally occur to one skilled in the art to which the invention relates.

This application claims priority to and incorporates by reference provisional application 60/076,255, filed Feb. 27, 1998.

The present invention provides an apparatus and a method for mounting the inner race of a bearing, including a bearing and shaft exposed to elevated temperature. For the types of materials used in the preferred embodiment, the present invention provides a ceramic bearing operable at temperatures to about 1200° F., with a state of compression in the inner race for temperatures below about 1,000° F. However, the apparatus and method described herein are useful in any application in which it is desirable to preload a state of compression into an inner race.

In a preferred embodiment of the present invention, a ceramic inner race rotatably supports a shaft within a gas turbine engine. The inner race is loaded with a compressive stress when the race and shaft are at low temperature. The present invention includes method and apparatus for maintaining the inner race in a general state of compression to about 1000° F., with minimal tensile stress to about 1200° F. such that the bearing may be operated to about 1200° F. By greatly minimizing or eliminating tensile stress within the ceramic inner race, the reliability of the inner race is greatly improved. Although the use of a ceramic inner race has been described, those of ordinary skill in the art will recognize the application of the present invention to other bearing materials where a general state of compression is desired. The preferred embodiment of the present invention includes one or more separable compression members that compress the inner race radially inward. Preferably, these separable compression members form a guide-way for the rolling elements of the bearing assembly and thus lower the expense of the inner race by eliminating the need for a separate guideway to be ground into the inner race.

The preferred embodiment also includes an intermediate member between the shaft and the inner race. The intermediate member is mounted on the shaft, and the inner race is mounted on the intermediate member. The intermediate member provides sufficient radial compliance between the inner race and the shaft so as to permit thermal growth of the shaft relative to the inner race. Because of the intermediate member, some of the thermal growth of the shaft is accommodated in a reduction of the distance from the outer diameter of the shaft to the inner diameter of the inner race, with a resultant decrease in the thickness of the intermediate member. The intermediate member is sometimes called a tolerance ring by those of ordinary skill in the art. In some embodiments, the intermediate member is a metallic strip that is approximately the width of the inner race, the strip having a sinusoidal or wavy shape.

One embodiment of the present invention includes a means for radially stiffening the mounted inner race. The stiffening means compensates, at least in part, for the reduction in radial stiffness of the inner race mounted to the shaft because of the compliant intermediate member. In one embodiment, the stiffening means includes a ring on either side of the inner race and a spring for urging together the inner race and the rings. The contact surfaces of the rings and the contact faces of the inner race are constructed and arranged so as to stiffen the inner race relative to the shaft in a radial direction upon urging together by the spring. Further, the urging together of the inner race and the two rings by the spring both axially and radially compresses the inner race. The contact surfaces and the contact faces are constructed and arranged so that the increase in radial stiffness is achieved with the application of radial compression to the inner race, rather than with radial tension, which is undesirable in most ceramic materials.

As used herein, the term "axial" refers to a force, movement or other quantity that occurs in a direction parallel to the centerline of a component. The term "radial" refers to a force, movement or other quantity that occurs in a direction perpendicular to the axial direction. For example, "radially inward" would be a direction toward the centerline of a component.

FIG. 1 depicts bearing apparatus 20, one embodiment of the present invention. Apparatus 20 is shown assembled in a gas turbine engine. A gas turbine engine is well-known to include a compressor that provides air to a combustor, the combustor mixing and burning fuel with the compressed air and delivering the combusted mixture to a turbine which drives the compressor. A gas turbine engine may also include a second turbine, and a fan, second compressor, or gear box driven by the second turbine. A portion of shaft 22 rotatable within the gas turbine and having centerline axis 23 is depicted. Other rotating components, such as a fan, compressor, turbine or gears may also be attached to or driven by shaft 22. Shaft 22 may be made from any suitable material for the particular application. One suitable shaft material for this application is Inconel 718, although those of ordinary skill in the art will recognize the suitability of other shaft materials for the present invention.

An intermediate member, a split tolerance ring 24, is mounted to outer diameter 27a of shaft 22. In one embodiment, intermediate member 24 is a strip of metal, such as Hastelloy C276 or Inconel 718 with waviness impressed thereupon. The strip of metal is preferably not formed as a one-piece ring, and instead retains a split in its circumference, and is attached to and wrapped around outer diameter 27a. Preferably, intermediate member 24 is an AN style of open tolerance ring, for example, as fabricated by USA Tolerance Rings of West Trenton, N.J. In a most preferred embodiment, intermediate member 24 is an AN series tolerance ring with a wave pitch of about 0.1968 inches, a wave height of about 0.0394 inches, a wave width of about 0.669 inches, and a material thickness of about 0.012 inches. This ring is designed to go between outer diameter 27a of 1.9685/1.9681 inches and inner diameter 27b of 2.0472/2.0469 inches. In this most preferred embodiment, intermediate member 24 includes about 30 waves per ring.

Mounted upon intermediate member 24 is inner race 26. Inner race 26 is in an interference fit upon intermediate member 24, inner diameter 25a of inner race 26 being smaller than outer diameter 25b of intermediate member 24, in the unassembled state. Inner race 26 preferably has a smooth, cylindrical outer diameter 50, a smooth, cylindrical inner diameter 25a, and contact faces 28 and 30 on either end of inner race 26. In a preferred embodiment, inner race 26 is fabricated from a ceramic material, although the present invention contemplates inner races fabricated from non-ceramic materials as well. In a most preferred embodiment, inner race 26 is fabricated from a silicon nitride ceramic material.

Figure 7B:
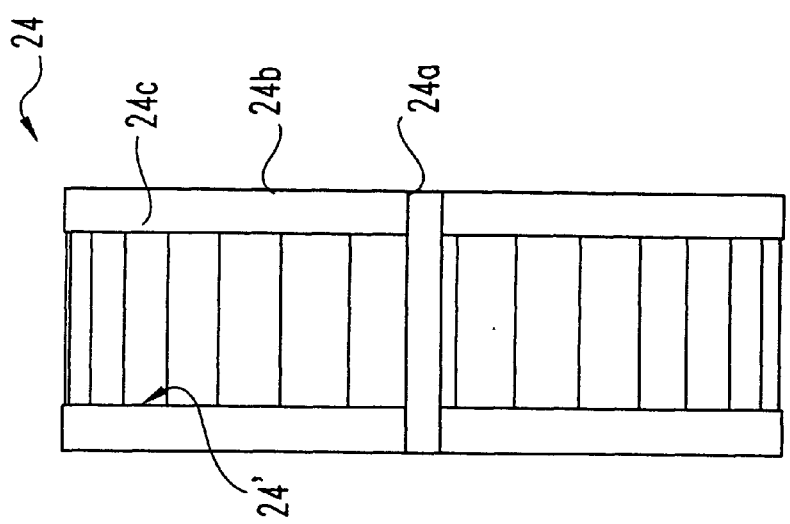
FIG. 7B is a radial view of the intermediate member of FIG. 7A.
Figure 7A:
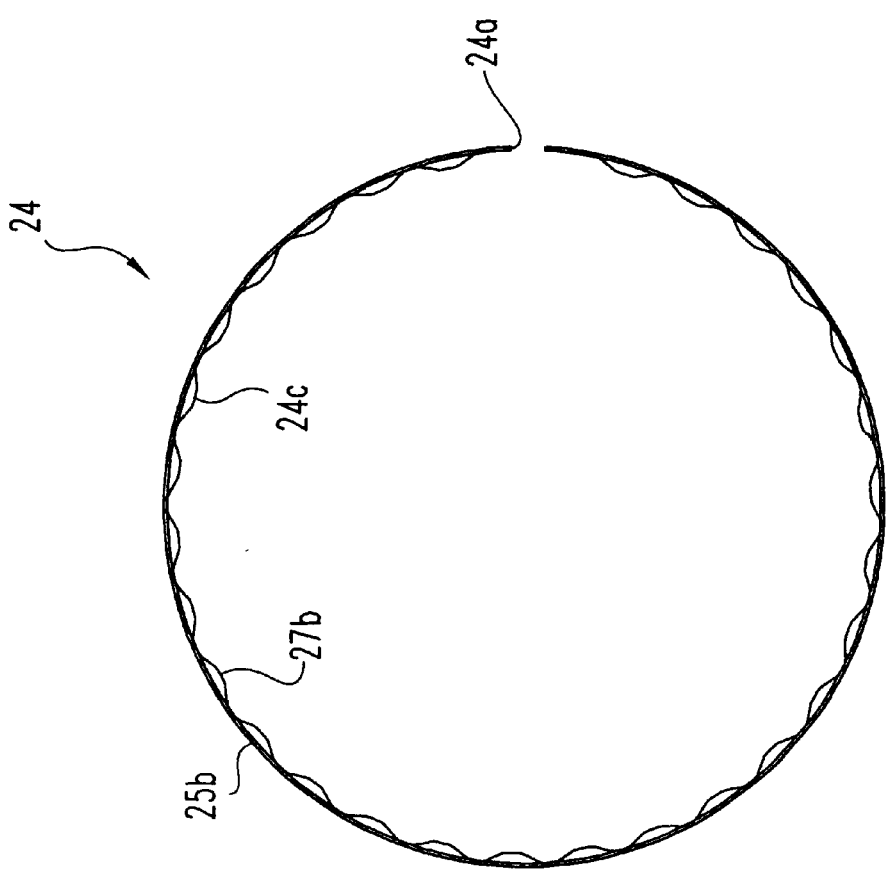
FIG. 7A is an axial view of an intermediate member according to one embodiment of the present invention.

FIGS. 7A and 7B show axial and radial views, respectively, of one embodiment of intermediate member 24. A plurality of waves 24c are formed upon a strip of material which is formed into the shape of a split ring with split 24a. Preferably each axial end of member 24 includes a flattened portion 24b which contacts inner race 26.

Intermediate member 24 provides grip to hold and approximately center inner race 26 on shaft 22. Intermediate member 24 also compensates for differential thermal growth between shaft 22 and inner race 26. This differential thermal expansion results from the difference in thermal expansion coefficients between inner race 26 and shaft 22. For example, silicon nitride has a thermal expansion coefficient of approximately $1.4 \times 10^{-6}$ to $2.1 \times 10^{-6}$ per degree F., and IN718 has a thermal expansion coefficient of approximately $7.2 \times 10^{-6}$ to $8.4 \times 10^{-6}$ per degree F. Thus, shaft 22 expands four times as much as inner race 26 for a particular change in temperature.

Referring again to FIG. 1, as apparatus 20 becomes hotter, outer diameter 27a of shaft 22 increases in size more quickly than inner diameter 25a of inner race 26. This differential thermal growth between shaft 22 and inner race 26 is accommodated by intermediate member 24. The growth of outer diameter 27a of shaft 22 forces inner diameter 27b of intermediate member 24 radially outward toward inner race 26. Because inner diameter 25a of inner race 26 experiences less thermal growth, the distance from outer diameter 27a to inner diameter 25a decreases. Thus, the height of the waviness of member 24 from inner diameter 27b to outer diameter 25b decreases. Intermediate member 24 acts as a spring, by elastically bending within transition section 24', by elastically flattening of the waves, and by imparting a radially outward load into inner race 26. Because intermediate member 24 in a most preferred embodiment is a strip of metal and is not integrated as a ring, the expansion of outer diameter 27a does not create hoop tension in member 24, since member 24 is not a hoop. Because of the split nature of intermediate member 24 and its inability to maintain hoop stress, there is no flattening of waves 24c of the intermediate member from hoop stress, which flattening would occur if the member were one piece in the form of a hoop. The radial outward load imparted by member 24 to inner race 26 under conditions of differential thermal growth acts to move the state of stress within inner race 26 in the direction of increasing tension.

Figure 2:
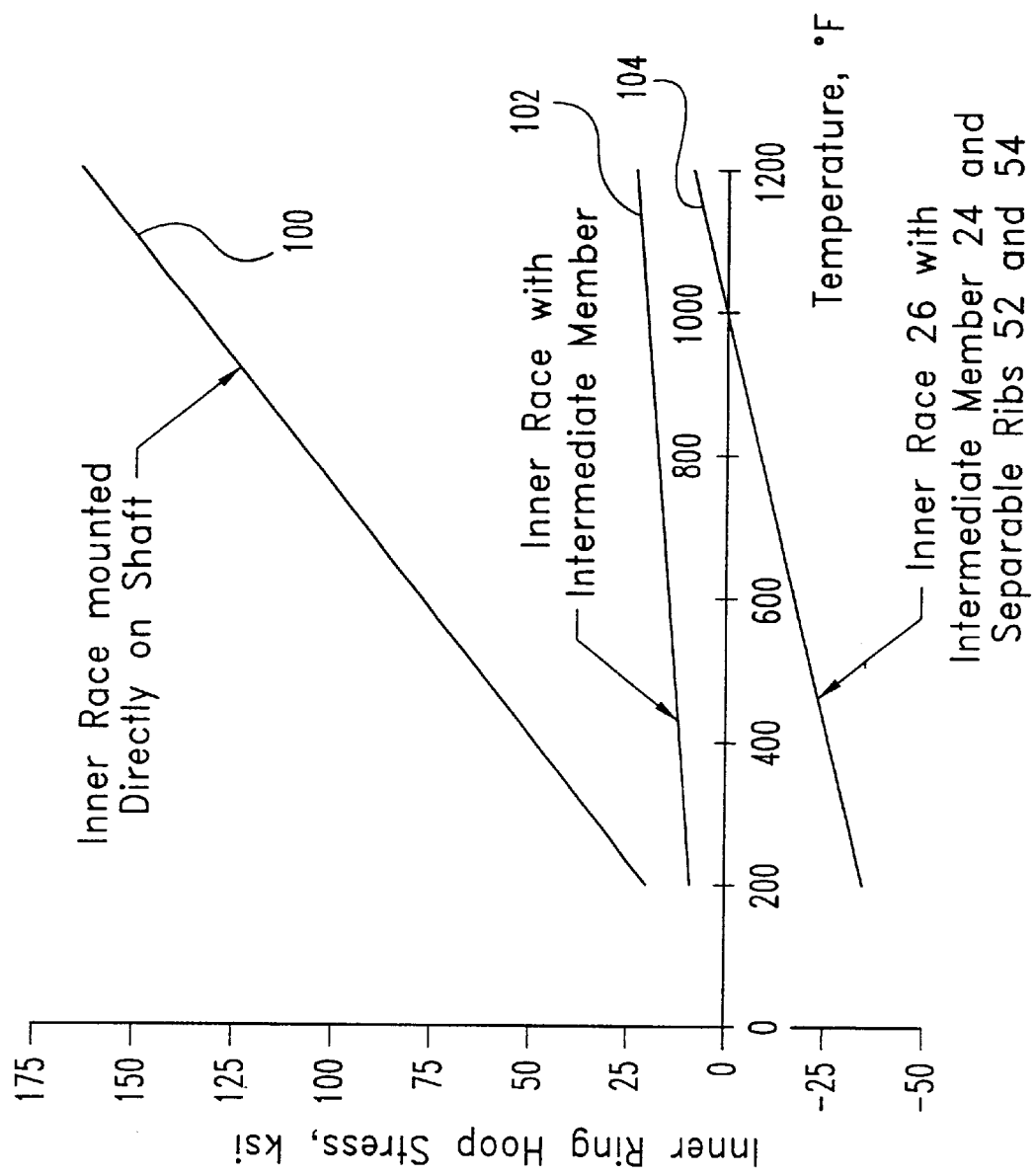
FIG. 2 is a graph relating stress in the inner race of a bearing on a shaft as a function of inner race temperature and for various inner race mounting arrangements.

The inner ring hoop stress of a ceramic inner race mounted directly to a shaft can be compared to that same stress within the inner race when there is an intermediate member between the inner race and the shaft. This is shown on FIG. 2. FIG. 2 is a graph relating inner ring hoop stress in the inner race of a bearing on a shaft as a function of inner race and shaft temperature and for various inner race mounting arrangements. Line 100 on FIG. 2 depicts the state of stress in an inner race mounted directly on a shaft with no intermediate member therebetween. The greater thermal growth of the shaft outer diameter relative to the inner race inner diameter results in greatly increasing tensile stress in the inner race as the shaft and inner race increase in temperature.

The usage of an intermediate member between the inner race and the shaft results in a general decrease in the state of stress of the inner race, as depicted by line 102 of FIG. 2, and also a decrease in the rate of increase of the stress as temperature increases. The intermediate member is radially compliant, and acts as a spring between the outer diameter of the shaft and the inner diameter of the inner race. This compliance reduces the load imparted by thermal growth of the shaft into the inner race. Although the use of a compliant intermediate member between the inner race and the shaft reduces the tensile stresses in the inner race, line 102 indicates that there is still tension within the inner race through the temperature range.

This state of tension in the inner race is further reduced and made generally compressive in the present invention by the use of at least one separable compression member compressing the inner race. A first separable compression member 52 is in contact with outer diameter 50 of race 26. First compression member 52 has an inner diameter that is smaller than outer diameter 50, constituting an interference fit. Thus, when assembled over race 26, first compression member 52 creates a state of compression within inner race 26. In a preferred embodiment, there is also a second separable compression member 54 assembled onto inner race 26 and acting upon inner race 26 to that of compression member 52. Compression members 52 and 54 are preferably rectangular in cross-section. In one embodiment, compression members 52 and 54 are spaced apart and act as ribs to guide a plurality of rolling elements therebetween. Using the compression members as a guideway reduces the expense of the ceramic inner race. The inner race can have a generally flat outer diameter, requiring less machining.

Placing compression members 52 and 54 onto diameter 50 preloads a compressive stress into inner race 26. The effect of installing compression members 52 and 54 on race 26 is depicted by line 104 of FIG. 3. Compression members 52 and 54 change the inner ring hoop stress of inner race 26 in a direction toward compression. This line shows that with a combination of compression members and intermediate member, inner race 26 is in a state of compression to about 1000° F. From 1000° F. to about 1200° F. the inner ring hoop stress is less than about 7,000 psi, which is an acceptable tensile stress given the low fracture toughness of the silicon nitride material. Those of ordinary skill in the art will recognize that the use of other materials in the present invention will result in a different temperature range of acceptable stresses.

Compression members 52 and 54 are made from material chosen for good strength and stiffness at the temperature of the particular application. The material should also have a thermal expansion coefficient that more closely matches the thermal expansion coefficient of inner race 26. In the preferred embodiment, compression members 52 and 54 are fabricated from Incolloy 909, although those of ordinary skill in the art will recognize the usage of other materials. This material has a thermal expansion coefficient of approximately $4.4 \times 10^{-6}$ per °F up to about 800° F., then rising to about $5.8 \times 10^{-6}$ per °F. at about 1200° F. In one embodiment, at room temperature outer diameter 50 of inner race 26 is approximately 2.258 inches, and the inner diameter of compression members 52 and 54 is approximately 2.244 inches, resulting in a cold interference fit of approximately 0.014 inches.

In those embodiments of the present invention operated in excess of 1000° F., the tendency of the Incolloy 909 to oxidize above 1000° F. is advantageous. The oxide coating is relatively soft and easily sheared. Because of these two properties, this oxide coating is at least partly lubricious and lubricates the interface between the rolling elements and guideway members 52 and 54 and also the interface between guideway members 52 and 54 and the cage. For example, this coating may be formed either during use of the bearing at temperatures in excess of the oxidation temperature, or during conditioning of the bearing prior to use by exposure of guideways 52 and 54 to temperatures in excess of the oxidation temperature. For example, in some embodiments this temperature conditioning prior to use occurs during assembly of the guideways onto the inner race. Those of ordinary skill in the art will recognize other methods for forming the oxide layer, including treating the guideways with oxidizing chemicals and machining methods such as electro-discharge machining.

The present invention also contemplates the use of other guideway materials known to those of ordinary skill in the art that form an oxide coating that is lubricious. Those of ordinary skill in the art will recognize that those embodiments utilizing different materials for the guideway members may have different temperatures at which a lubricating oxide coating forms. For those embodiments in which the guideway members do not form a lubricious oxide coating, and it may be advantageous to coat the guideways with a solid lubricant or hard coating known to those of ordinary skill in the art. The present invention also contemplates those embodiments in which the guideway members do not compress the inner race, but instead are mounted on the outer race.

In some embodiments of the present invention, compression members 52 and 54 provide a path for guiding a plurality of rolling elements 56, which are preferably roller bearings. Compression members 52 and 54 also form a guide for cage 66 which circumferentially spaces rolling elements 56. Compression members 52 and 54 are preferably hard coated, such as with a diamond compound, in a manner known to those of ordinary skill in the art on wear surfaces 58 and 60, respectively. Compression members 52 and 54 may also incorporate solid lubricant coatings on surfaces 58 and 60. The present invention also contemplates those embodiments in which one or more compression members preload a compressive stress into the inner race, but which include other elements for guiding the roller bearings, including guides that are attached to the outer race.

Outer race 62 provides the outer surface path for rolling elements 56. Outer race 62 is retained in housing 64 of the gas turbine engine in a manner known to those of ordinary skill in the art. In a most preferred embodiment of the present invention, outer race and rolling elements 56 are fabricated from ceramic material, although the present invention also contemplates those embodiments in which the outer race and rolling elements are fabricated from non-ceramic materials.

Although the present invention has been described with rolling elements 56 that are preferably roller bearings, those of ordinary skill in the art will also recognize that ball bearings may also be used. In an embodiment with ball bearings, inner race 26 includes a groove for the ball bearings. Further, compression members 52 and 54 would not serve as guides for the balls, but would still place inner race 26 in compression.

Because intermediate member 24 provides compliance between shaft 22 and race 26, there are some embodiments of the present invention where additional radial stiffness of race 26 relative to shaft 22 is incorporated, for example, in the case of a shaft with a large rotating imbalance. In one such embodiment, the inner race is stiffened in the radial direction relative to the shaft by a pair of mounting rings 36 and 38 on either side of inner race 26. In a preferred embodiment, each generally circular ring 38 and 36 has an inner diameter in sliding contact with outer diameter 27a of shaft 22. Rings 36 and 38 preferably include tapered, conical contact surfaces in sliding contact with tapered, conical contact faces of inner race 26. The first angled contact surface 32 of ring 36 contacts first angled contact face 28 of inner race 26. In a preferred embodiment, face 28 and centerline 23 form an included angle 29 of about 60 degrees. Second ring 38 includes outer contact surface 46 abutting step face 48 of shaft 22. Ring 38 includes second angled contact surface 34 in contact with second angled contact face 30 of inner race 26. Face 30 also forms an included angle of about 60° relative to centerline 23. In a most preferred embodiment, contact surface 34 is tapered at an angle complementary to contact face 30, and contact surface 32 is tapered at an angle complementary to the angle of contact face 28.

In a preferred embodiment, a pair of belleville springs 42 and 44 are mounted on shaft 22 such that a face of spring 42 urges together ring 36, inner race 26, and ring 38. Springs 42 and 44 bias ring 36 toward inner race 26 with an axially aligned force. This axial force likewise biases inner race 26 toward second ring 38. The angled contact surfaces of rings 36 and 28 working on the angled contact faces of inner race 26 translate a portion of the axial force from springs 42 and 44 into a radially compressing force on inner race 26.

The angled contact surfaces of rings 36 and 38 working on the angled contact faces of inner race 26 also translate radial movement of inner race 26 into axial movement of ring 36. Radial outward motion of race 26 results in sliding of face 28 against surface 32 and of face 30 against surface 34, and sliding of ring 36 along diameter 27 of shaft 22. Belleville springs 42 and 44 bend in an elastic manner and resist the axial movement of ring 36. In the preferred embodiment, rings 36 and 38 are chosen from a material that has a thermal coefficient of expansion which about matches the thermal expansion coefficient for shaft 22. For example, rings 36 and 38 are preferably made from IN718 or Waspaloy, and springs 42 and 44 are preferably fabricated from IN718. Although belleville springs have been shown and described, the present invention also contemplates other types of springs, including, for example, one or more coil springs or one or more circular wave springs to resist the axial movement of ring 36.

Ring 36 and springs 42 and 44 bias inner race 26 along axis 23 of shaft 22. As apparatus 20 increases in temperature, shaft 22 grows in the axial direction more than race 26. Springs 42 and 44 provide a force against surface 40 of ring 36, and urge ring 36 to slide along shaft 22 and maintain contact with race 26. This minimizes or prevents an axial gap due to differences in thermal growth.

Contact faces 28 and 30 of inner race 26 are preferably faces that are tapered conically outward from centerline 23. This outwardly conical taper transforms a portion of the axial force from springs 42 and 44 into a radially compressing force on inner race 26. However, the present invention contemplates other shapes for contact faces 28 and 30 that likewise translate a portion of an axial force into a radially compressing force component on inner race 26, including curving and rounded shapes. In addition, the present invention also contemplates contact faces 28 and 30 that are not conically tapered at the same angle, such that one face forms an included angle with centerline 23 that is greater than the included angle of the other face.

Figure 3:
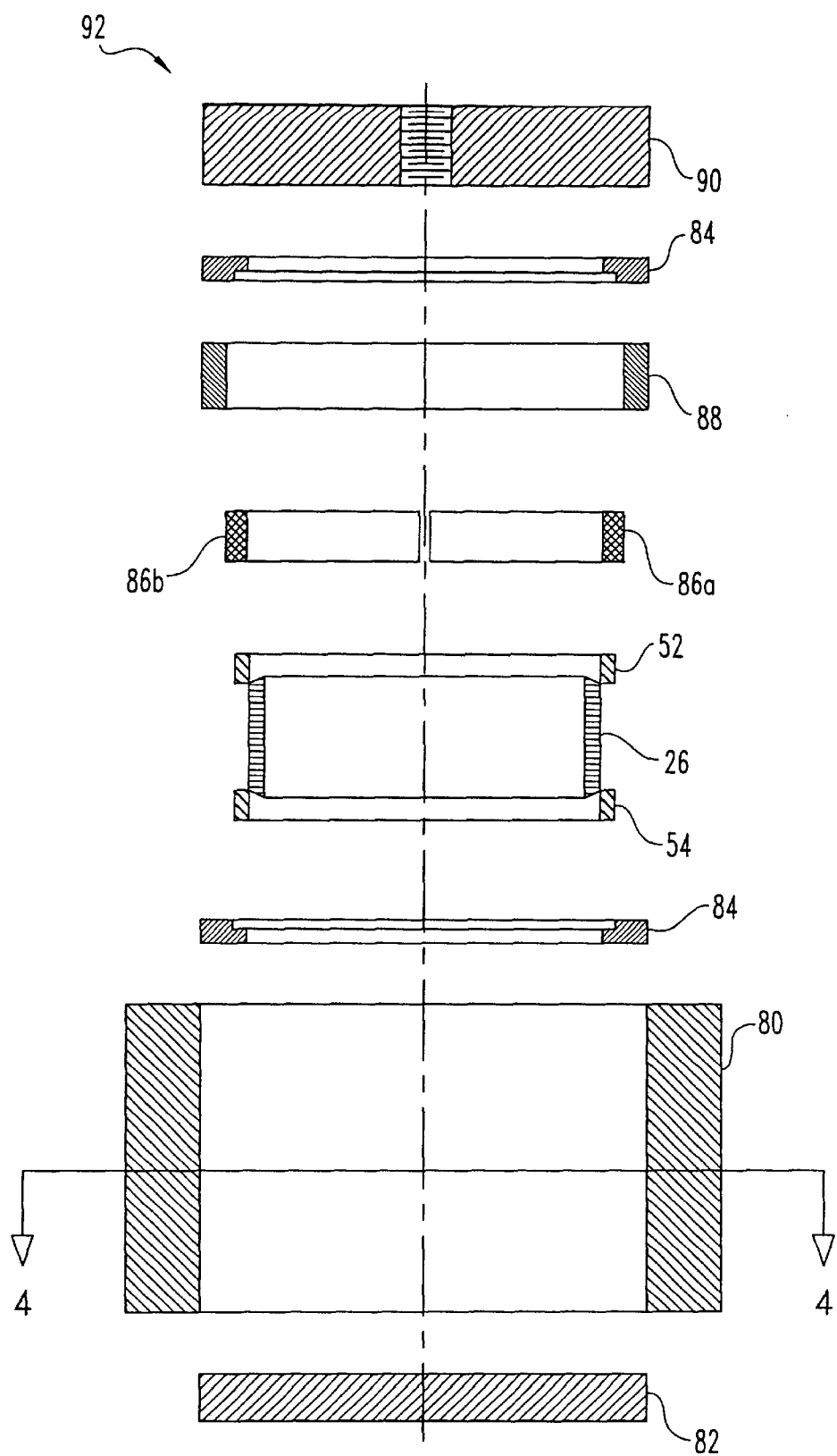
FIG. 3 is an exploded, cross-sectional view of an apparatus for assembly according to one embodiment of the present invention.
Figure 4:
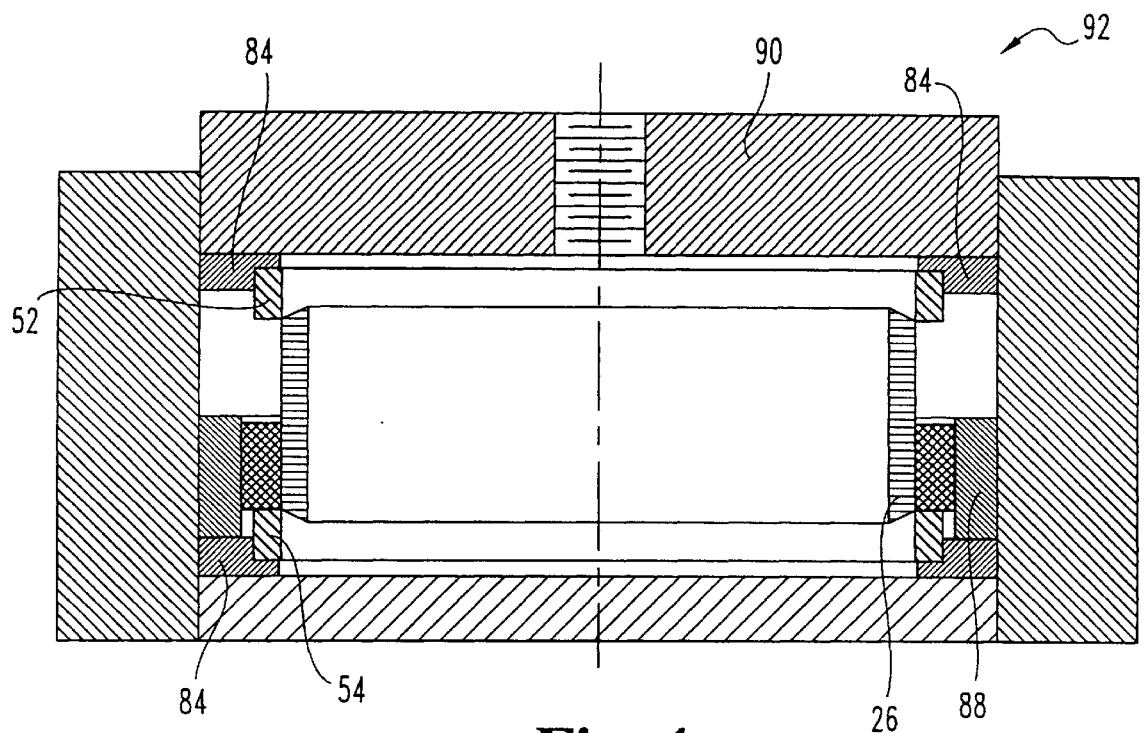
FIG. 4 is a non-exploded view of the apparatus of FIG. 3, prior to assembly.
Figure 5:
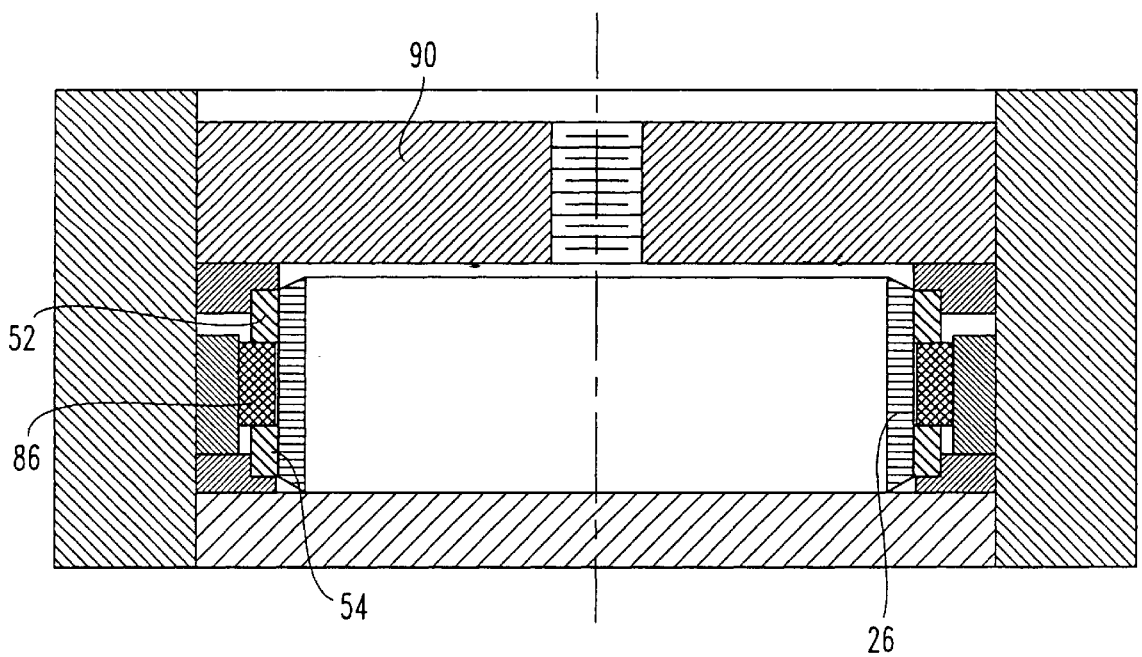
FIG. 5 is a view of the apparatus of FIG. 4, after assembly.

FIGS. 3, 4 and 5, depict apparatus 92 for the assembly of separable compression members 52 and 54 onto inner race 26. An inner pilot 84 is placed onto a fixture base 82 within a generally cylindrical outer pilot 80. Separable compression member 54 is placed within a notch of inner pilot 84. Inner race 26, which is an interference fit with compression members 52 and 54, is placed in contact with the inner diameter of member 54. A pair of c-ring spacers 86a and 86b, each of about 180° arc length, are placed in contact with compression member 54 and inner race 26. Spacers 86a and 86b have an axial length arranged to establish the correct spacing between separable compression members 52 and 54 for the guiding of rolling elements. A generally cylindrical keeper ring 88 surrounds spacers 86a and 86b, keeping spacers 86a and 86b in position. A second, separable compression member 52 is placed in contact with a corner of the contact face of inner race 26. A second inner pilot 84 is placed in contact with separable member 52, which is received within a notch of pilot 84. A top mandrel 90 is placed in contact with the top inner pilot 84.

Assembly 92 is then heated to a temperature as high as about 1500° F. At that temperature, separable members 52 and 54 have expanded more than inner race 26, such that there is little or no interference fit between the inner diameter of the compression members and the outer diameter of the inner race. Top mandrel 90 is then pressed downward, such that compression members 52 and 54 are placed over the outer diameter of inner race 26, with c-rings 86a and 86b maintaining proper spacing between members 52 and 54 for rolling elements. FIG. 5 shows assembly 92 after compression members 52 and 54 have been pressed into place.

A preferred embodiment of the present invention is assembled into a gas turbine engine in the following manner. Ring 38 is placed onto shaft 22 into abutting relationship with step face 48. Intermediate member 24 is mounted onto shaft 22. The assembly of inner race 26 and compression members 54 and 52 is mounted upon intermediate member 24 by being pressed onto outer diameter 25b thereof. Mounting ring 36 is placed onto shaft 22 and into contact with inner race 26. Belleville springs 42 and 44 are pressed onto shaft 22 and into contact with mounting ring 36. Rolling element cage 66, which is preferably fabricated from carbon-carbon, is placed over compression members 54 and 52, and rolling elements 56 are inserted into their respective positions within cage 66, and are held in place temporarily. This temporary retention of rolling elements 56 is discarded when the assembly of the shaft, rings, inner race, springs, and rolling elements is placed within housing 64 of the gas turbine engine. In one embodiment of the present invention, housing 64 incorporates means for reducing peak dynamic structural loads into the ceramic bearing components, such as an impact damper. Outer race 62 is mounted within housing 64 in a manner known to those of ordinary skill in the art.

Figure 6:
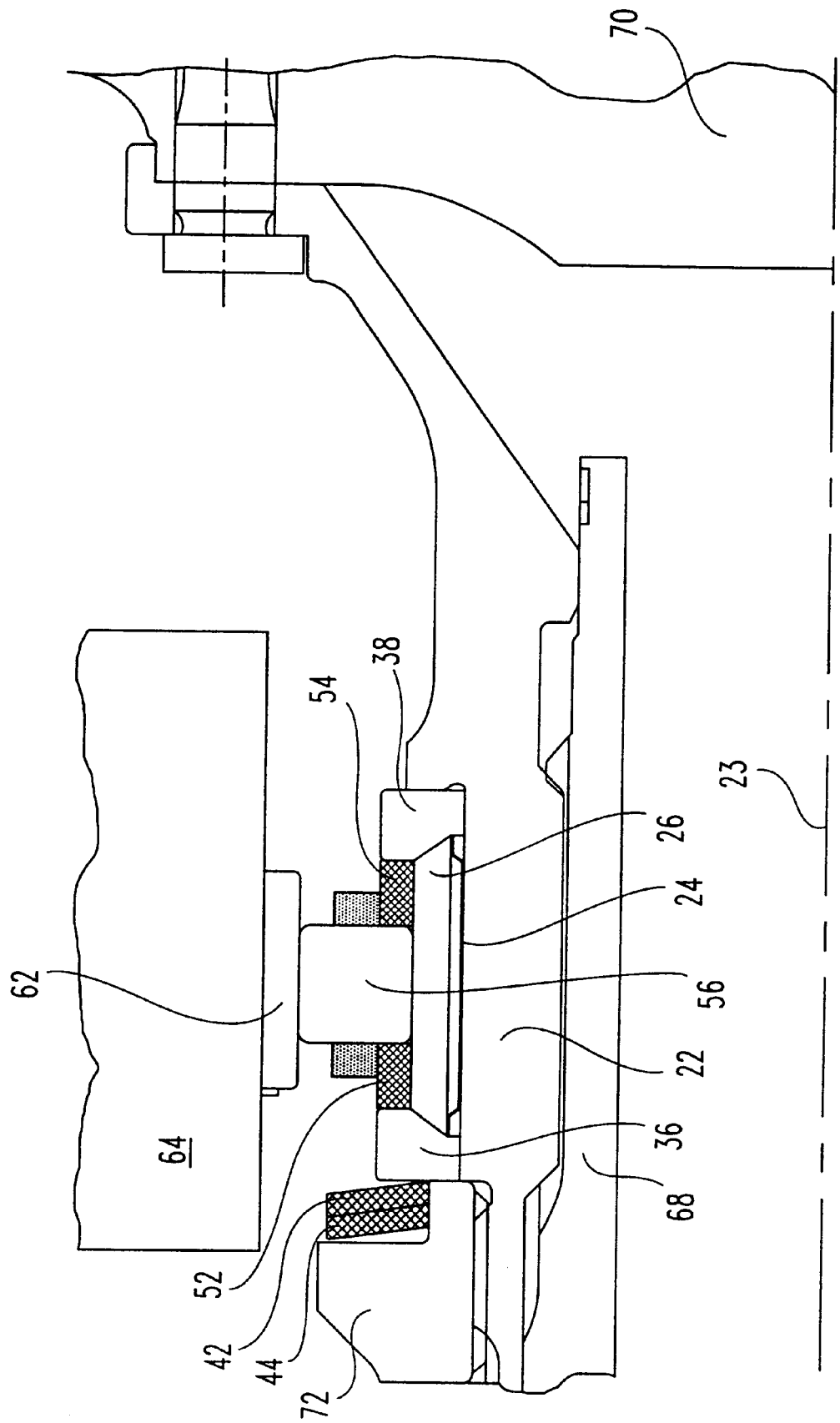
FIG. 6 is a diagrammatic cross-sectional view of another embodiment of the present invention within a gas turbine engine.

FIG. 6 depicts another embodiment of the present invention. The use of a prime (') mark by an element number indicates that the prime element is the same as the non-prime element, except as described. Intermediate member 24 is wrapped around and mounted to a stub shaft 22' that is coupled by fasteners to a turbine wheel 70. A second shaft 68 engages an inner diameter of stub shaft 22' by a set of splines. Belleville springs 42 and 44 urge together mounting ring 36, inner race 26, and mounting ring 38. Springs 42 and 44 are retained upon a spring retainer 72 that couples to stub shaft 22' by splines.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus comprising:
    a shaft;
    a ceramic inner race having an outer diameter;
    an intermediate member mounted on said shaft, said intermediate member being in the general shape of a split ring, said inner race being mounted on said intermediate member, said inner race mounted on said intermediate member being radially compliant to permit thermal growth of said shaft relative to said inner race; and
    a first separable compression member mounted in interference fit on the outer diameter and radially compressing said inner race.

2. The apparatus of claim 1 further comprising a second separable compression member mounted in interference fit on the outer diameter and compressing said inner race.

3. The apparatus of claim 2 further comprising a plurality of rolling elements, wherein said rolling elements are guided between said first separable compression member and said second separable compression member.

4. The apparatus of claim 3 wherein said first compression member and said second compression member each have a hard coating.

5. The apparatus of claim 1 further comprising a first ring on said shaft and a spring, said first ring being urged toward said inner race by said spring, said first ring and said spring cooperating to stiffen said inner race relative to said shaft in a radial direction.

6. The apparatus of claim 1 further comprising a spring, and a first ring with a contact surface, said first ring being urged toward said inner race by said spring, and wherein said inner race has a contact face, the contact surface being in sliding contact with the contact face, the contact surface and contact face being arranged and constructed so that said inner race is radially compressed inward by the urging of said spring.

7. The apparatus of claim 1 further comprising a first ring, a second ring, and a spring, wherein said inner race is between said first ring and said second ring, said first ring, said inner race, and said second ring being urged together by said spring, said second ring and said first ring cooperating to compress said inner race.

8. The apparatus of claim 7 further comprising a gas turbine engine in which the shaft is rotatable.

9. The apparatus of claim 8 wherein said inner race is fabricated from silicon nitride.

10. The apparatus of claim 1 further comprising a gas turbine engine in which said shaft is rotatable.

11. A method for mounting an inner race of a bearing on a shaft comprising:
    providing a gas turbine with a shaft, a ceramic inner race, an intermediate member with a general split ring shape, a first ring and a second ring;
    loading a compressive stress into the inner race;
    placing the intermediate member on the shaft between the shaft and the inner race;
    urging the first ring, second ring, and inner race together in an axial direction; and
    compressing the inner race in a radial direction by said urging.

12. The method of claim 11 which further comprises compensating for differential thermal growth between the shaft and the inner race by the intermediate member.

13. The method of claim 11 wherein said loading is by placing two separable rings on the inner race, the inner diameters of the separable rings being an interference fit with the outer diameter of the inner race.

14. The method of claim 13 wherein said providing includes a plurality of rolling elements, and which further comprises guiding the rolling elements between the two separable rings.

15. An apparatus comprising:

a gas turbine;

a shaft rotatable within said gas turbine;

an inner race rotatably supporting said shaft, said inner race having an outer diameter, an inner diameter, and two ends, each end having a contact face;

a first ring, said first ring and one of the contact faces being urged together;

a second ring, said second ring and the other of the contact faces being urged together;

a plurality of rolling elements in rolling contact with said inner race;

a first separable member mounted to said inner race; and a second separable member mounted to said inner race, said first separable member and said second separable member providing a guide for said rolling elements;

wherein the one contact face and said first ring are constructed and arranged so as to radially compress said inner race when urged together and the other contact face and said second ring are constructed and arranged so as to radially compress said inner race when urged together.

16. The apparatus of claim 15 which further comprises a spring for urging together said first ring and the one contact face and for urging together said second ring and the other contact face.

17. The apparatus of claim 16 wherein said spring is a belleville spring.

18. The apparatus of claim 16 wherein said inner race is fabricated from a ceramic material.

19. The apparatus of claim 16 wherein each end of said inner race has an outwardly conical contact face, and said first ring has a contact surface generally complementary to the one contact face and said second ring has a contact surface generally complementary to the other contact face.

20. The apparatus of claim 15 which further comprises an intermediate member mounted to said shaft, wherein said inner race is mounted to said intermediate member.

21. The apparatus of claim 15 wherein said inner race has an outer diameter, and said first and second separable members are mounted in interference fit on the outer diameter of said inner race, thereby radially compressing said inner race.

22. An apparatus comprising:

a gas turbine engine with a housing;

a shaft rotatable within said gas turbine engine, said shaft having a step face;

an outer race mounted within the housing;

a ceramic inner race having an outer diameter and a contact face;

an intermediate member mounted on said shaft, said inner race being mounted on said intermediate member, said intermediate member being radially compliant, said intermediate member being a split ring;

a first compression member in contact with the outer diameter;

a second compression member in contact with the outer diameter;

a plurality of rolling elements in bearing contact with said outer race and said inner race, said rolling elements being guided between said first compression member and said second compression member;

a first ring with a contact surface in sliding contact with the contact face of said inner race; and a spring urging said first ring in an axial direction along said shaft, and cooperating with said first ring to urge said inner race in a radially inward direction;

wherein said first compression member and said second compression member urge said inner race radially inward.

23. A method for lubricating a bearing, comprising:

providing an inner race, a plurality of rolling elements, a first separable guideway, and a second separable guideway;

mounting the first separable guideway and the second separable guideway onto the inner race;

forming an oxide coating on the first separable guideway and the second separable guideway;

guiding the rolling elements between the first separable guideway and the second separable guideway; and lubricating the rolling elements with the oxide coating.

24. The method of claim 23 which further comprises compressing the inner race by said mounting.

25. The method of claim 23 wherein the first separable guideway and the second separable guideway are fabricated from Incolloy 909.

26. The method of claim 23 wherein said forming is by heating the first separable guideway and the second separable guideway.

27. The method of claim 26 wherein the heating occurs during said mounting.

* * * * *